US007832443B2

(12) United States Patent
Hirokawa et al.

(10) Patent No.: US 7,832,443 B2

(45) Date of Patent: Nov. 16, 2010

(54) SURFACE TREATMENT APPARATUS FOR PRINTED SHEETS

(75) Inventors: Katsushi Hirokawa, Fuchu (JP); Takahiko Nakamura, Fuchu (JP); Hiroyoshi Kuwahara, Fuchu (JP); Yoshifumi Mitsunari, Fuchu (JP)

(73) Assignee: Ryobi Ltd, Hiroshima-Ken (JP)

( * ) Notice: Subject to any disclaimer, the term of this patent is extended or adjusted under 35 U.S.C. 154(b) by 304 days.

(21) Appl. No.: 12/144,564

(22) Filed: Jun. 23, 2008

(65) Prior Publication Data

US 2009/0000745 A1 Jan. 1, 2009

(30) Foreign Application Priority Data

Jun. 28, 2007 (JP) ............................ 2007-170316
Apr. 23, 2008 (JP) ............................ 2008-112486

(51) Int. Cl.
*B32B 37/12* (2006.01)
*B32B 37/10* (2006.01)

(52) U.S. Cl. .................. 156/379.6; 156/379.8; 156/387

(58) Field of Classification Search .............. 156/379.4, 156/379.6, 379.8, 384; 101/424.1, 218
See application file for complete search history.

(56) References Cited

U.S. PATENT DOCUMENTS 5,671,678 A * 9/1997 Bolte et al. ................. 101/491
6,119,751 A * 9/2000 Nilsen et al. ................ 156/384
2006/0254445 A1* 11/2006 Masuda .................. 101/424.1
2006/0266795 A1* 11/2006 Heckenthaler et al. ...... 228/101
2009/0056858 A1* 3/2009 Davila Casitas et al. .... 156/184

FOREIGN PATENT DOCUMENTS

DE 10318909(A1) 11/2004
DE 102006021069 11/2006
JP 2006-315229 11/2006

* cited by examiner

*Primary Examiner*—Khanh Nguyen
*Assistant Examiner*—Vishal I. Patel
(74) *Attorney, Agent, or Firm*—TIPS Group

(57) ABSTRACT

A surface treatment apparatus for printed sheets that is capable of preventing radiation of UV rays onto printed sheets when out of use including a varnishing section for applying UV cure resin varnish on a printed sheet; a cylinder for conveying a printed sheet with the UV cure resin varnish applied thereon at the varnishing section; a film pressing part for pressing a transfer film onto a printed sheet on the cylinder; and a UV radiation part for curing UV cure resin varnish of a printed sheet onto which the transfer film is being pressed by the film pressing part. The UV radiation part is positioned close to the cylinder when the film pressing part is positioned close to the impression cylinder; and the UV radiation part is positioned away from the cylinder when the film pressing part is positioned away from the cylinder.

7 Claims, 4 Drawing Sheets

SURFACE TREATMENT APPARATUS FOR PRINTED SHEETS

CROSS REFERENCE TO RELATED APPLICATION

This application claims priority from Japanese Patent Application Nos. 2007-170316 and 2008-112486, which are incorporated herein by reference.

BACKGROUND OF THE INVENTION

1. Field of the Invention

The present invention relates to a surface treatment apparatus for printed sheets that enhances the added value of a printed sheet of paper by pressing a transfer film onto the printed sheet, thus transferring gold foil, embossed pattern, hologram pattern, etc. on the transfer film.

2. Related Art

There was proposed a gloss-finishing machine that enhances the added value of a printed sheet of paper (hereinafter referred simply to as "printed sheet") in the manner mentioned above. This machine includes a varnishing unit for applying UV (ultraviolet) cure resin varnish, and a hologram forming unit for pressing a transfer film onto a printed sheet having varnish applied by the varnishing unit, thereby transferring hologram pattern or the like on the printed sheet. The hologram forming unit includes an impression cylinder for conveying printed sheets, a pair of pressing rollers for pressing a transfer film onto each printed sheet on the impression cylinder, a UV radiation part for curing varnish when the transfer film is kept pressed onto the printed sheet on the impression cylinder by the pair of pressing rollers, and a shutter means disposed forward of the radiation side (downside) of the UV radiation part for being shifted between a retracted position at which UV rays from the UV radiation part are allowed to be radiated onto a printed sheet, and a shuttering position at which UV radiation from the UV radiation part is cut off. The pair of pressing rollers are arranged to be movable towards and away from the impression cylinder between a retracted position above the impression cylinder and a pressing position at which they are positioned close to the impression cylinder. With this arrangement, when hologram forming (surface treatment) is not carried out, the pressing rollers are positioned at the retracted position above the impression cylinder while at the same time the shutter means is shifted to the shuttering position, thereby preventing UV rays from being radiated onto the printed sheet (cf. Patent Document 1, for example).

(Patent Document 1) Japanese Patent Application Laid-open No. 2006-315229

According to the above gloss-finishing machine of the Patent Document 1, a special shutter means is necessitated, which causes not only the increase in the number of parts, but also makes it impossible to dispose the UV radiation part sufficiently close to the impression cylinder due to the necessity to dispose the shutter means between the impression cylinder and the UV radiation part. Therefore, UV rays radiated from the UV radiation part may not be able to be efficiently utilized and hence a large-sized high-performance UV radiation part must be used, which causes increase in the size of the machine as well as a disadvantage in terms of cost. When hologram forming is not carried out and no shuttering means is employed, the UV radiation part may be structured to be switched on and off so that UV rays are not radiated onto the printed sheet when the UV radiation part is switched off.

However, since it is likely that the UV radiation part cannot be immediately turned into operation when it is switched again from off to on, the operation efficiency may be deteriorated and therefor this method is difficult to be employed in actual operation.

SUMMARY OF THE INVENTION

In consideration of the above circumstances, it is an object of the present invention to provide a surface treatment apparatus for printed sheets that is capable of securely preventing radiation of UV rays onto printed sheets when out of use, while efficiently radiating UV rays onto printed sheets when in use, as well as suppressing the increase in the number of parts.

According to the present invention, there is provided a surface treatment apparatus for printed sheets that includes: a varnishing section for applying UV cure resin varnish to a printed sheet conveyed in a printed sheet conveying path; a cylinder for conveying a printed sheet with the UV cure resin varnish applied thereon at the varnishing section; a film pressing part for pressing a transfer film onto a printed sheet on the cylinder; and a UV radiation part for curing UV cure resin varnish of a printed sheet onto which the transfer film is being pressed by the film pressing part; wherein the film pressing part is movable towards and away from the cylinder; the UV radiation part is movable towards and away from the cylinder; the UV radiation part is positioned close to the cylinder when the film pressing part is positioned close to the cylinder; and the UV radiation part is positioned away from the cylinder when the film pressing part is positioned away from the cylinder.

When the surface treatment of a printed sheet is not performed, the film pressing part is moved to a position away from the cylinder, thereby positioning the UV radiation part away from the cylinder and thus enabling prevention of radiation of UV rays onto the printed sheet. When the surface treatment of a printed sheet is performed, the film pressing part is moved to a position close to the cylinder, thereby positioning the UV radiation part close to the cylinder and thus enabling UV cure resin varnish of the printed sheet to be cured.

Only with the arrangement in which the UV radiation part is movable towards and away from the cylinder along with the movement of the film pressing part, it is possible to omit the necessity to provide a conventional shutter means and prevent the increase in the number of parts. Whereby, when the surface treatment is performed, it is possible to position the UV radiation part closer to the cylinder than ever before and therefore efficiently cure UV cure resin varnish. Consequently, only a low-performance UV radiation part is required and thus the size of the entire machine can be reduced. When the surface treatment is not performed, UV rays can be prevented from being radiated onto a printed sheet since the UV radiation part has been moved away from the cylinder, and thus no adverse influence is exerted on the printed sheet.

The surface treatment apparatus may further include a single driving means for moving any one of the film pressing part and the UV radiation part towards and away from the cylinder and an interlocking mechanism for interlocking the film pressing part and the UV radiation part together so as to integrally move both the film pressing part and the UV radiation part by the driving means. With this arrangement, it is possible to integrally move the film pressing part and the UV radiation part via the interlocking mechanism only by actuating or stopping actuation of the single driving means, and thus achieve a simplified structure compared with an arrangement in which the film pressing part and the UV radiation part are driven independently of each other by separate driving means.

The interlocking mechanism may include a support member that supports the film pressing part and the UV radiation part, and a guide member for guiding the support member and that is movable towards and away from the cylinder; and the driving means includes an actuator to move the support member. With this arrangement, it is possible to integrally move the film pressing part and the UV radiation part only by moving the support member by the actuator. During this movement, the guide member enables the support member with the film pressing part and the UV radiation part supported thereon to be smoothly moved.

The surface treatment apparatus may further include a supply roll, on which the transfer film is wound up so as to be able to be fed out therefrom, at least one pressing roller for pressing the transfer film, which has been fed out from the supply roll, onto a printed sheet on the cylinder, and a winding roll for winding up thereon the transfer film, which has been pressed onto the printed sheet by the at least one pressing roller and then peeled off from the same, wherein the film pressing part is made up of the at least one pressing roll and a portion of the transfer film, which portion is being pressed onto a printed sheet on the cylinder. With this arrangement, the support member can be sized small enough to support the at least one pressing roller and the portion of the transfer film, which portion is being pressed onto the printed sheet on the cylinder. Thus, the support member can be reduced in weight, and the downsizing of the entire apparatus can be achieved by using a low-performance actuator.

The UV radiation part may be made up of an even number of UV lamps that are evenly divided into two parts that are respectively disposed on the opposite lateral sides of the printed sheet conveying path with respect to a vertical line passing through the rotational center of the cylinder, so as to be substantially symmetrically arranged about the vertical line. With this arrangement, the UV lamps can be arranged in good balance with the vertical line therebetween, and therefore it is possible not only to enable the film pressing part and the UV radiation part to be smoothly moved without distortion during the vertical movement, but also to reduce the size of the apparatus in the printed sheet conveying direction as compared with an arrangement in which those parts are moved obliquely upwards.

The UV radiation part may include a UV radiation control means for enabling the UV radiation part to radiate UV rays both at a position close to the cylinder and at a position away from the cylinder. With this arrangement, the UV radiation can be constantly continued, so that even when the UV radiation part kept away from the cylinder has been moved close to the cylinder, required UV rays can be immediately radiated.

The surface treatment apparatus may further include an emergency stop control means that starts moving the film pressing part and the UV radiation part respectively to the positions away from the cylinder when the surface treatment apparatus has been emergency stopped, and allows the UV radiation part to continue radiating UV rays for a predetermined time. With this arrangement, even when a printed sheet with UV cure resin varnish coated thereon is left between the film pressing part and the cylinder at the time when the surface treatment apparatus has been emergency stopped, the UV cure resin varnish can be immediately cured by radiating UV rays onto the UV cure resin varnish by the UV radiation part, which has started moving away from the cylinder. Therefore, the UV cure resin varnish is unlikely to be adhered to the transfer film and thus there is an advantage in that the transfer film can be reused.

BRIEF DESCRIPTION OF THE DRAWINGS

The above, and other objects, features and advantages of the present invention will become apparent from the detailed description thereof in conjunction with the accompanying drawings wherein.

DESCRIPTION OF THE REFERENCE CODES

1: Sheet supply section, 2: Sheet of paper (printed sheet), 3: Printing section, 4: Varnishing section, 4A: Varnishing cylinder, 4B: Impression cylinder, 5: Transfer film, 5A: Portion, 6: Surface treatment apparatus, 6A: Casing, 7: Sheet discharge section, 7A, 7B: Sprockets, 7C: Chain, 8-12: Printing units, 8A-12A: Printing impression cylinders, 8B-12B: Transfer cylinders, 14: Transfer cylinder, 18: Transfer cylinder, 19: Impression cylinder, 20: UV radiation part, 21, 22: Cases, 21A, 22A: UV lamps, 23: Supply roll, 24, 25: Pressing rollers, 26: Winding roll, 27: Support member, 28: Guide member, 28A: Fixed element, 28B: Movable element, 29: Air cylinder, 29A: Extendable rod, 29*a*: Threaded portion, 30: Gear, 31: Rack, 31*a*: Threaded portion, 32: UV radiation control means, 33: Emergency stop control means, 34: Second emergency stop control means, R1-R10, R13-R16: Rollers, S: Vertical line, X: Rotational center

DETAILED DESCRIPTION OF THE PREFERRED EMBODIMENT

Figure 1:
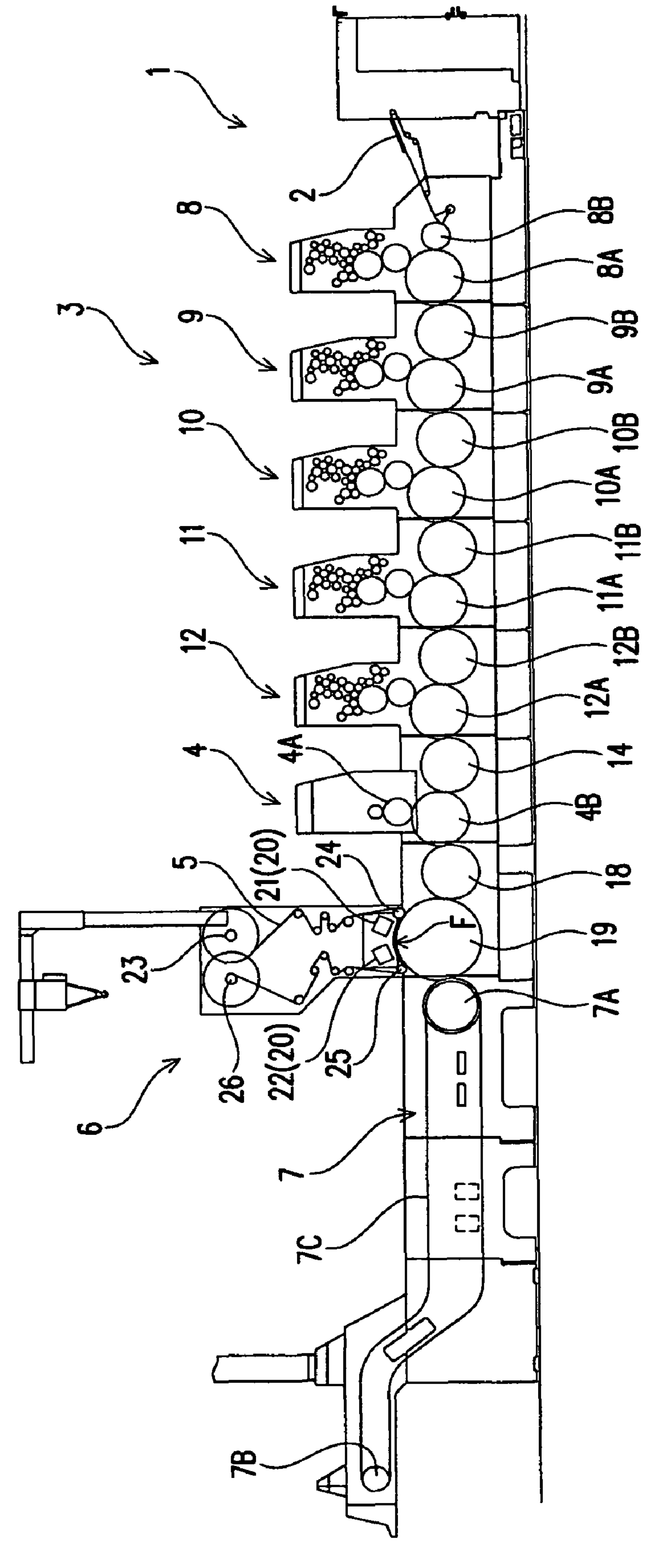
FIG. 1 is a schematic side view of a sheet-fed printing press.

FIG. 1 illustrates one example of a printing press that includes a surface treatment apparatus 6 that is capable of processing a printed surface of each printed sheet by applying resin varnish on the printed surface, thereby giving glossy finish to the printed surface and then pressing a transfer film 5 having embossed pattern, hologram pattern, etc. on to the printed sheet, thereby transferring these patterns onto the printed surface, or by pressing a transfer film having a metal transfer layer, such as gold foil, onto the printed sheet, thereby transferring the metal transfer layer onto the printed surface. This printing press includes a sheet supply section 1 for feeding sheets 2 as printed sheets one by one from a sheet stack table by a feeder or a sheet separator, a printing section 3 for printing on each sheet 2 from the sheet supply section 1, a varnishing section 4 for applying or coating UV cure resin varnish on each sheet printed at the printing section 3, a surface treatment apparatus 6 for surface treatment of each sheet 2 by pressing the transfer film 5 onto the UV cure resin varnish applied on the printed sheet at the varnishing section 4, and a sheet discharge section 7 for discharging each sheet 2 having its surface processed by the surface treatment apparatus 6. In this embodiment, the printing section 3 is made up of five printing units 8, 9, 10, 11 and 12 for 5-color printing, while on the other hand, it is possible to employ a printing section that is designed for single color printing or two or more color printing other than five color printing. The sheet discharge section 7 is made up of a chain conveyor having grippers in this embodiment, while it is possible to employ a printing press that does not have the sheet discharge section 7. Also, it is to be noted that the specific structures of the respective elements or parts of the printing press are not limited to those illustrated in the drawings. As a printed sheet, separate or independent sheets of paper are used in this embodiment, while it is possible to employ a continuous sheet of paper. The surface treatment apparatus 6 may be incorporated into the printing press, or may not be incorporated into the same to be used as an independent unit.

The printing units 8-12 respectively include printing impression cylinders 8A-12A and transfer cylinders 8B-12B. Although not illustrated, the cylinders 8A-12A, 8B-12B each have grippers that are disposed at two portions (alternatively, it is possible to employ one gripper or three or more grippers for each cylinder) on the circumference of the cylinders, in which each gripper has a claw and a claw block that together grip each sheet 2 fed out. The varnishing section 4 includes a varnishing cylinder 4A to which UV cure resin varnish is supplied, an impression cylinder 4B disposed opposite to the varnishing cylinder 4A for applying UV cure resin varnish on each printed sheet 2, and a transfer cylinder 14 for transferring each sheet 2 to these cylinders 4A and 4B. Both the cylinders 14 and 14B each have grippers disposed at two positions (alternatively, it is possible to employ one gripper or three or more grippers for each cylinder) on the circumference for gripping each sheet 2 fed out by a claw block and a claw.

Figure 2:
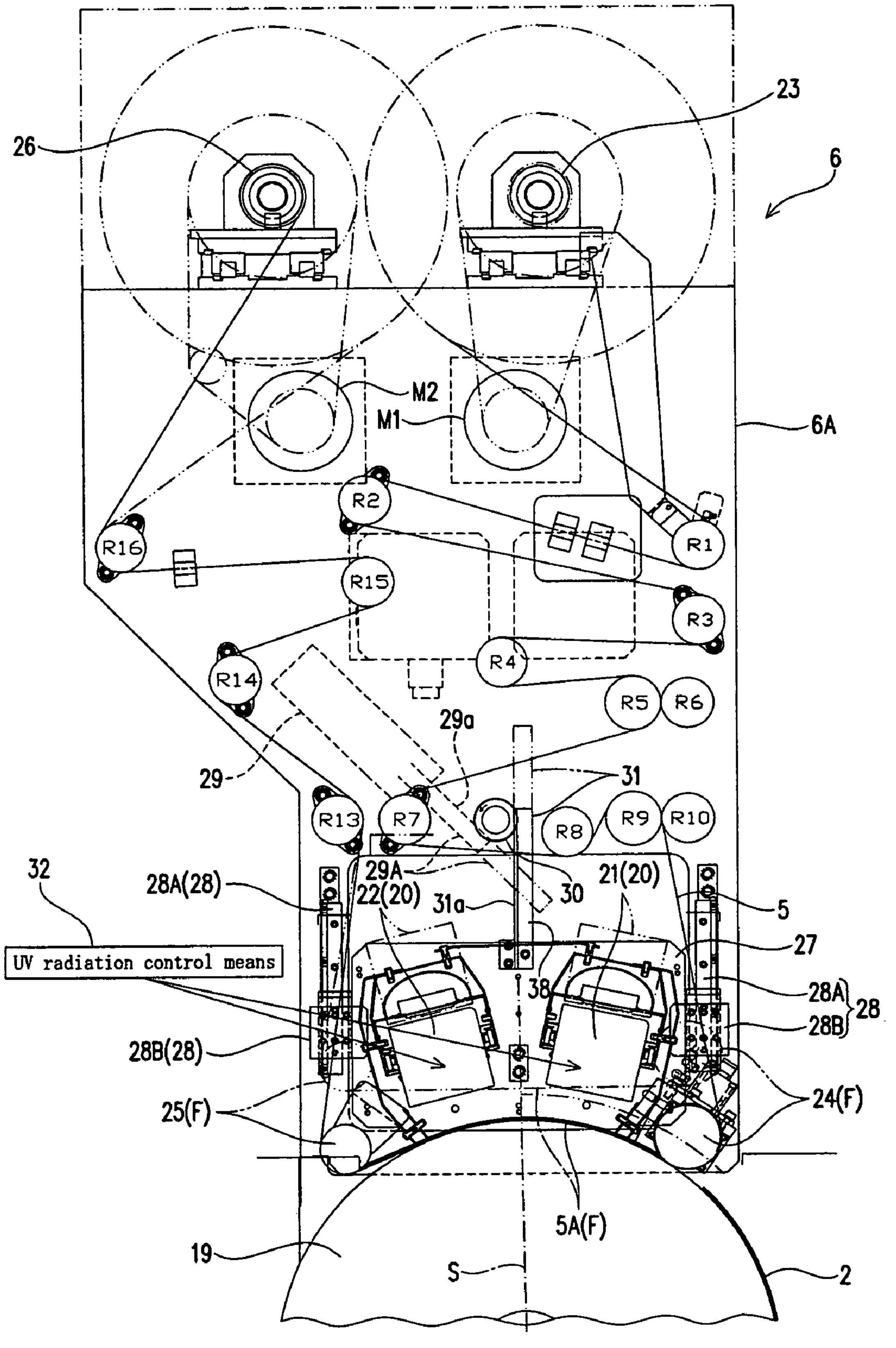
FIG. 2 is a side view of a surface treatment apparatus.

As illustrated in FIGS. 1 and 2, the surface treatment apparatus 6 includes, in the same manner as the varnishing section 4, an upstream transfer cylinder 18 having grippers disposed at two positions (alternatively, it is possible to employ one gripper or three or more grippers for the transfer cylinder) on the circumference for griping each sheet 2 fed from the impression cylinder 4B, a downstream impression cylinder, which may be referred simply to a cylinder, for receiving each sheet 2 fed from the transfer cylinder 18, a film pressing part F for pressing the transfer film 5 onto each sheet 2 on the impression cylinder 19, and a UV radiation part 20 for curing UV cure resin varnish of each sheet 2, onto which the transfer film 5 is being pressed by the film pressing part F. Accordingly, the transfer film 5 is pressed onto each sheet 2 on the impression cylinder 19 while being fed in the same direction as the downstream impression cylinder 19, so that embossed patter, hologram pattern or the like is formed on the UV cure resin varnish and the transfer film 5 is attached to the sheet 2 through the varnish, which acts as adhesive. Under this state, UV rays are radiated onto the sheet 2 through the attached transfer film 5, thereby curing the UV cure resin varnish and thus enabling the varnish with various patterns formed thereon to be integrated with the sheet 2. The transfer film 5 and the sheet 2, which have reached an terminal end of a conveying path, are moved in such a direction as to be separated away from each other, and thus the transfer film 5 is peeled off from the sheet 2 and wound up on a hereinafter described winding roll 26, and the sheet 2 having the cured UV cure resin varnish integrally formed therewith is conveyed to the sheet discharge section 7. Although the surface treatment apparatus 6 includes the transfer cylinder 18 as a constitutional element, it is possible to employ the surface treatment apparatus 6 that omits the transfer cylinder 18. The transfer cylinder 18 may be formed by a chain conveyor or other conveying devices. The surface having the UV cure resin varnish applied thereto can be smoothened by pressing the transfer film 5 onto the UV cure resin varnish of the sheet 2, and thus there is provided an advantage of enhancing the glossiness. In order to enable UV rays from the UV radiation part 20 disposed above the transfer film 5, which is being pressed onto the sheet 2 on the impression cylinder 19, to be radiated onto the UV cure resin varnish held between the transfer film 5 and the sheet 2, a UV ray transmittable material, such as a transparent synthetic resin film is used for the transfer film 5.

Figure 3:
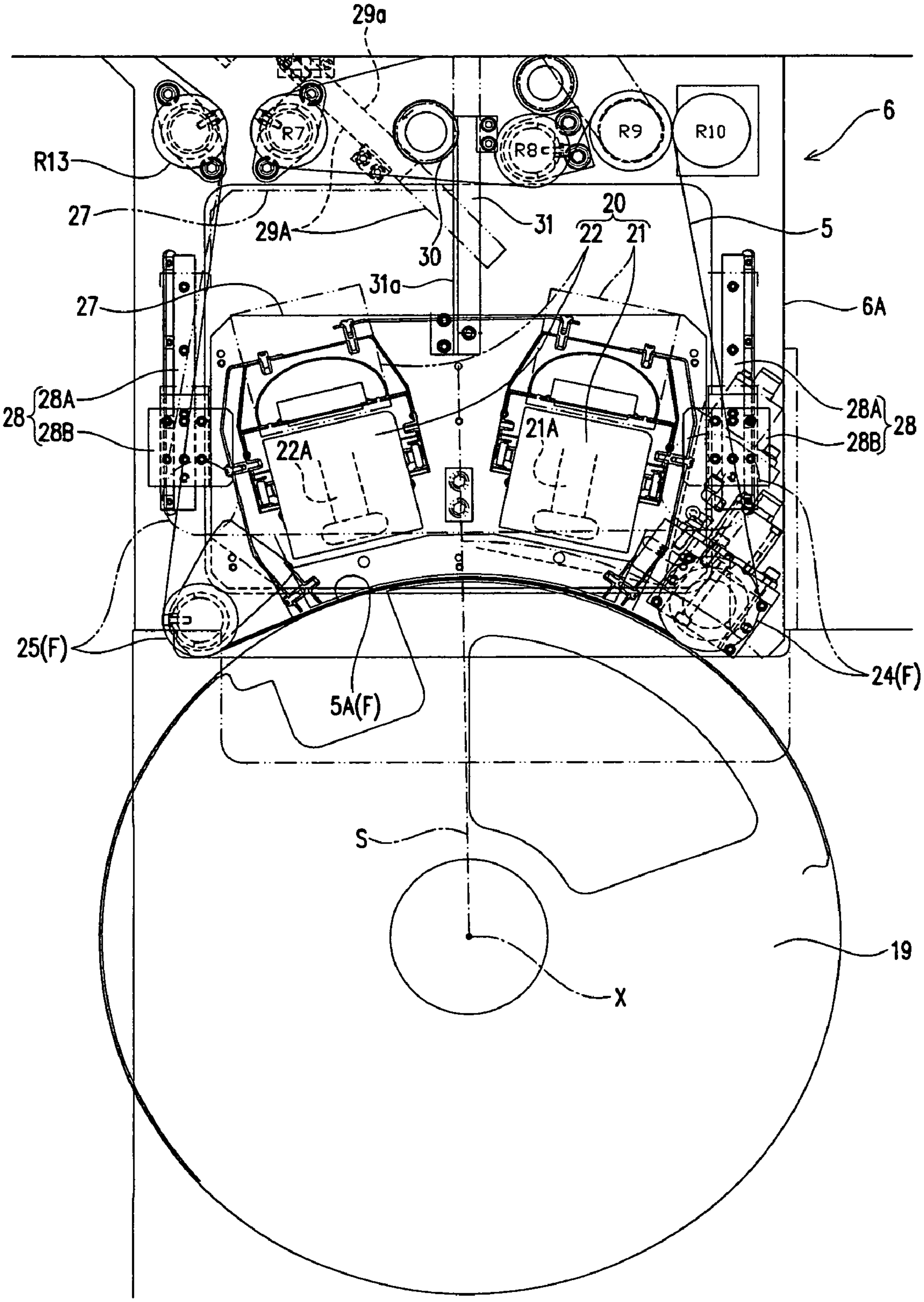
FIG. 3 is an enlarged side view illustrating a lower portion of the surface treatment apparatus.

As illustrated in FIG. 3, the UV radiation part 20 is made up of two cases 21, 22 with two UV lamps (alternatively, four or more UV lamps may be mounted therein when plural are employed) respectively mounted therein, and these two UV lamps 21A, 21B are respectively disposed on the opposite lateral sides of the printed sheet conveying path about a vertical line S passing through a rotational center X of the impression cylinder 19. If four or more UV lamps are employed, they are evenly divided into two parts that are respectively disposed on the opposite lateral sides of the printed sheet conveying path. Specifically, the UV lamps 21A, 21B are substantially symmetrically arranged about the vertical line S, so that they are movable in the vertical direction without distortion. The UV lamps 21A, 21B are tilted to cross the horizontal axis to each have a lower surface (radiation surface) oriented substantially in parallel with the circumferential surface of the impression cylinder 19. However, according to needs and circumstances, they may be oriented to be in parallel with the horizontal axis.

As illustrated in FIGS. 2 and 3, the film pressing part F is designed to be movable towards and away from the impression cylinder 19, and the UV radiation part 20 is designed to be movable towards and away from the impression cylinder 19, in which the UV radiation part 20 is positioned close to the impression cylinder 19 (the position represented by the solid line in the Figures) when the film pressing part F is positioned close to the impression cylinder 19 (the position represented by the solid line in the Figures); and the UV radiation part 20 is positioned away from the impression cylinder 19 (the position represented by the chain double-dashed line in the Figures) when the film pressing part F is positioned away from the impression cylinder 19 (the position represented by the chain double-dashed line in the Figures). Next, the description will be made for the structure thereof.

First, the description will be made in detail for the surface treatment apparatus 6. As illustrated in FIGS. 1 and 2, the surface treatment apparatus 6 includes a supply roll 23, on which the transfer film 5 is wound up so as to be able to be fed out therefrom, two pressing rollers 24, 25 (alternatively, it is possible to employ one pressing roller or three or more pressing rollers) for pressing the transfer film 5, which has been fed out from the supply roll 23 onto the impression cylinder 19, onto the printed sheet 2 on the impression cylinder 19, a winding roll 26 for winding up the transfer film 5, which has been pressed onto the printed sheet 2 by the pressing rollers 24, 25 and then peeled off from the same. The film pressing part F is made up of the pressing rollers 24, 25 and a portion 5A of the transfer film 5, which portion 5A is being pressed onto the sheet 2 on the impression cylinder 19 by the pressing rollers 24, 25. R1-1R illustrated in FIG. 2 represent rollers disposed between the supply roll 23 and the pressing roller 24 disposed upstream of the conveying direction for film guiding. R13-R16 represent rollers disposed between the pressing roller 25 disposed downstream of the conveying direction and the winding roll 26. The pressing roller 25, which is disposed downstream of the conveying direction, is disposed above the impression cylinder 19 with a predetermined distance therefrom, thereby allowing the transfer film 5 to be smoothly peeled off or separated from the sheet 2, while it is possible to have the pressing roller 25 held in pressed contact with the impression cylinder 19.

A driving means is provided to move the film pressing part F or the UV radiation part 20 towards and away from the impression cylinder 20, and an interlocking mechanism for interlocking the film pressing part F and the UV radiation part 20 together so as to integrally move both the parts. In other words, the film pressing part F or the UV radiation part 20 is driven by the driving means to be moved towards and away from the impression cylinder 19 so that the residual can be integrally moved therewith through the interlocking mechanism.

Specifically, the interlocking mechanism includes a support member 27 that is movable towards and away from the impression cylinder 19; has a thickness direction oriented in the horizontal direction; and that supports the pressing rollers 24, 25 and the transfer film 5 extending between the pressing rollers 24, 25, of the film pressing part F, and cases 21, 22 having two UV lamps (not illustrated) of the UV radiation part 20 respectively mounted therein. The interlocking mechanism further includes a pair of guide members 28, 28 for guiding the support member 27. The driving means is provided with an air cylinder 29 as an actuator to move the support member 27. Each guide member 28 is made up of a fixed element 28A that has an angular cross section with an elongated vertical axis and is fixed to a casing 6A of the surface treatment apparatus 6, and a movable element 28B that is mounted on the fixed element 28A with or without a bearing therebetween in such a manner as to be movable smoothly in the vertical direction. The guide members 28 may be made up of different elements or parts.

The extendable rod 29A of the air cylinder 29 has a threaded portion 29*a* to be meshed with a gear 30 rotatably fixed to the casing 6A of the surface treatment apparatus 6. A rack 31 has a threaded portion 31*a* that converts the rotational force of the gear 30 rotated by the telescopic motion of the extendable rod 29A into the vertically moving force. A lower end of the rack 31 is connected to an upper end of the support member 27 at its center portion in the sheet conveying direction. Accordingly, when the surface treatment is not performed, the extendable rod 29A of the air cylinder 29 is extended to a position represented by the chain double-dashed line in FIGS. 2 and 3, so that the gear 30 is rotated in the anti-clockwise direction, thereby moving the rack 31 to an upper position represented by the chain double-dashed line, while the support member 27 is moved to an upper position. Whereby, the film pressing part F (the pressing rollers 24, 25 and a portion of the transfer film 5 extending between the pressing rollers 24, 25) and the UV radiation part 20 (two UV lamps 21A, 22A) can be moved upward away from the impression cylinder 19. In order to enter into the surface treatment from the above state, the extendable rod 29A of the air cylinder 29 is contracted to a position represented by the broken line in FIGS. 2 and 3, so that the film pressing part F (the pressing rollers 24, 25 and a portion of the transfer film 5 extending between the pressing rollers 24, 25) and the UV radiation part 20 (two UV lamps 21A, 22A) can be moved towards the impression cylinder 19 (cf. the solid line in FIGS. 2 and 3).

The UV radiation part 20 is provided with a UV radiation control means 32 (cf. FIG. 2) for enabling the UV radiation part 20 to constantly radiate UV rays both at a position close to the impression cylinder 19 and at a position away from the same. Even in this arrangement, in which the UV radiation part 20 radiates UV rays even at a position away from the impression cylinder 19, little adverse influences are applied to sheets of paper since the UV radiation part 20 (UV lamps 21A, 21B) can be sufficiently kept away from the impression cylinder 19 or kept at a retracted position above the impression cylinder 19. In addition, when the surface treatment is desired to be performed, immediate radiation of UV rays by the UV radiation part 20 is possible to be made only by moving the UV radiation part 20, which constantly radiates UV radiations, from the position away from the impression cylinder 19 to the position close to the impression cylinder 19.

In FIGS. 2 and 3, the film pressing part F (the pressing rollers 24, 25 and a portion of the transfer film 5 extending between the pressing rollers 24, 25) and the UV radiation part 20 (the UV lamps 21A, 21B) are moved towards and away from the impression cylinder 19 by a single actuator 29, while it is possible to employ an arrangement in which the film pressing part F and the UV radiation part 20 are moved towards and away from the impression cylinder 19 independently of each other by using two actuators. Alternative to the arrangement in which the UV radiation part 20 is moved in the vertical direction, it is also possible to employ an arrangement in which the case 21 or 22 of the UV radiation part 20 is rotatably supported and is drivingly rotated by an actuator, so that the case 21 or 22 is driven by the actuator to allow the radiation sides of the UV lamps 21A, 21B to face the direction in which UV rays are not radiated onto the oncoming sheets.

The sheet discharge section 7 is provided with a conveyor for receiving the oncoming sheets which have been treated at the surface treatment apparatus and conveying the same to a predetermined position. This conveyor is comprised of a pair of right and left endless chains 7C that are each wound around a pair of sprockets 7A, 7B and that are provided with grippers (although not illustrated, they have the same structure as that of the aforesaid grippers) disposed at the opposite ends of the sheet conveying path for gripping each oncoming sheet (cf. FIG. 1).

An emergency stop control means 33 (cf. FIG. 4) is provided to deal with emergency stop of the surface treatment apparatus 6, and more specifically emergency stop of the surface treatment apparatus 6, which is operated in synchronization with the printing press, due to the emergency stop of the printing press, by allowing the film pressing part F and the UV radiation part 20 to start moving towards the retracted position and allowing the UV radiation part 20 to continue radiating UV rays for a predetermined time. Thus, even when the surface treatment apparatus 6 is emergency stopped and sheets, on which UV cure resin varnish has been applied, are left between the film pressing part F and the impression cylinder 19, the UV cure resin varnish can be immediately cured by radiating UV rays from the UV radiation part 20 during the movement of the UV radiation part 20 to the retracted position.

When a film having a metal transfer layer, such as gold foil, is used as the transfer film 5, it is likelihood that the metal transfer layer 5 may be molten by UV rays concentrated to a limited portion of the transfer film 5, which concentration may take place when the surface treatment apparatus 6 is emergency-stopped while the radiation of UV rays is being radiated. Once the metal transfer layer is molten, it may cause adverse influences, such as adhering to the sheet 2 or the surrounding parts of the surface treatment apparatus 6. Therefore, a second emergency stop control means 34 (cf. FIG. 4) is provided when a film having a metal transfer layer such as gold foil is used. Specifically, when the surface treatment apparatus 6 is emergency stopped, the second emergency stop control means 34 immediately stops the radiation of UV rays from the UV radiation part 20 and at the same time allows the film pressing part F and the UV radiation part 20 to start moving towards the retracted position.

Accordingly, when a film having a metal transfer layer such as gold foil is used as the transfer film 5, the emergency stop control can be made by the second emergency stop control means 34. When a film having embossed pattern, hologram pattern or the like but not having a metal transfer layer such as gold foil is used as the transfer film 5, it is preferable to employ an arrangement in which any one of the two control means 33, 34 can be selected during operation so as to enable the emergency stop control means 33 to carry out the emergency stop.

Specifically, selection buttons (mode switching means) are provided on a touch monitor (not illustrated) so as to allow an operator to select a first mode for continuation of the radiation of UV rays and a second mode for immediate termination of the radiation of UV rays, when the surface treatment apparatus 6 has been emergency stopped. Since a transfer film having a metal transfer layer such as gold foil cannot be reused due to the arrangement in which the transfer layer is necessarily transferred, UV cure resin varnish adhered to the transfer film is less likely to cause a problem. Therefore, when the surface treatment apparatus 6 has been emergency stopped during transfer of the metal transfer layer, such as gold foil, of the transfer film, the radiation of UV rays can be immediately terminated.

Figure 4:
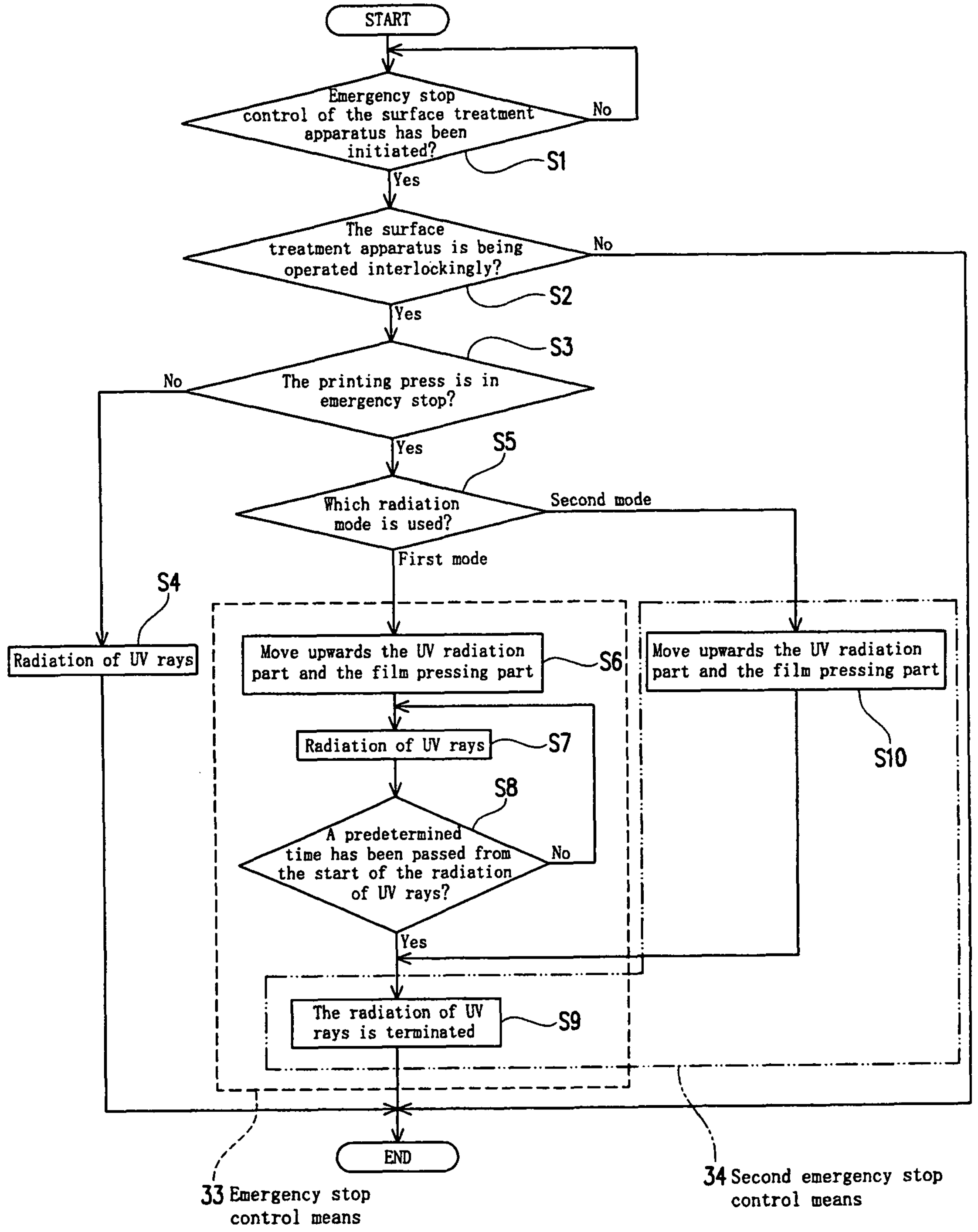
FIG. 4 is a block diagram illustrating the operation of emergency stop control.

Now, the description will be made in more specific manner for the emergency stop control by the two control means 33, 34, with reference to the flowchart of FIG. 4.

It is determined whether the emergency stop control of the surface treatment apparatus 6 has been initiated (Step S1). When the emergency stop control of the surface treatment apparatus 6 has been initiated, the operation proceeds to the next step, in which it is determined whether the surface treatment apparatus 6 is being operated in association with the printing press, or whether the surface treatment apparatus 6 is being operated interlockingly with the printing press (Step S2).

When the surface treatment apparatus 6 is in operation, it is determined whether the printing press is in emergency stop (Step S3). When it is determined that the printing press is not in emergency stop, the radiation of UV rays is continued (Step S4) and thus the control is finished. This emergency stop of the printing press includes two cases, one in which the printing press is emergency stopped manually, and another in which the printing press is emergency stopped automatically upon detection of a trouble by the printing press itself.

When it is determined that the printing press is in emergency stop, it is determined which radiation mode is used, on the basis of the output signal from the selection button (Step S5). When it has been determined that the used radiation mode is a first mode, the operation proceeds to the control by the emergency stop control means 33, thereby moving upwards the UV radiation part and the film pressing part F (Step S6), and at the same time the radiation of UV rays is continued (Step S7). After the radiation of UV rays is continued for a predetermined time from the start of the radiation of UV rays (Step S8), the radiation of UV rays is terminated and thus control is finished. Herein, the radiation of UV rays is continued for three seconds from the start of the radiation of UV rays, but this radiation time may be varied as long as UV cure resin varnish can be cured in that time.

When it has been determined that the used radiation mode is a second mode, the operation proceeds to the control by the second emergency stop control means 34, thereby moving upwards the UV radiation part 20 and the film pressing part F (Step S10), and at the same time the radiation of UV rays is immediately terminated and thus the control is finished.

Meanwhile, the aforesaid control is finished after moving upwards the UV radiation part 20 and the film pressing part F to the positions respectively away from the impression cylinder 19. Although the UV radiation part 20 is moved away from the impression cylinder 19 along with the upward movement of the UV radiation part 20, UV cure resin varnish can be securely cured by allowing the UV radiation part 20 to radiate UV rays for a predetermined time in the first mode. This can be achieved since the moving speed of the UV radiation part 20 and the film pressing part F is slow.

This specification is by no means intended to restrict the present invention to the preferred embodiments set forth therein. Various modifications to the surface treatment apparatus, as described herein, may be made by those skilled in the art without departing from the spirit and scope of the present invention as defined in the appended claims.

What is claimed is:

1. A surface treatment apparatus for a printed sheet comprising:

a varnishing section for applying UV cure resin varnish to a printed sheet conveyed in a printed sheet conveying path; a cylinder for conveying a printed sheet with the UV cure resin varnish applied thereon at the varnishing section; a film pressing part for pressing a transfer film onto a printed sheet on the cylinder; and a UV radiation part for curing UV cure resin varnish of a printed sheet onto which the transfer film is being pressed by the film pressing part; wherein the film pressing part is movable towards and away from the cylinder; the UV radiation part is movable towards and away from the cylinder; the UV radiation part is positioned close to the cylinder when the film pressing part is positioned close to the cylinder; and the UV radiation part is positioned away from the cylinder when the film pressing part is positioned away from the cylinder.

2. The surface treatment apparatus according to claim 1, further comprising a single driving means for moving any one of the film pressing part and the UV radiation part towards and away from the cylinder and an interlocking mechanism for interlocking the film pressing part and the UV radiation part together so as to integrally move both the film pressing part and the UV radiation part by the driving means.

3. The surface treatment apparatus according to claim 2, wherein the interlocking mechanism includes a support member that supports the film pressing part and the UV radiation part, and a guide member for guiding the support member and that is movable towards and away from the cylinder; and the driving means includes an actuator to move the support member.

4. The surface treatment apparatus according to claim 3, further comprising a supply roll, on which the transfer film is wound up so as to be able to be fed out therefrom, at least one pressing roller for pressing the transfer film, which has been fed out from the supply roll, onto a printed sheet on the cylinder, and a winding roll for winding up thereon the transfer film, which has been pressed onto the printed sheet by the at least one pressing roller and then peeled off from the same, wherein the film pressing part is made up of the at least one pressing roll and a portion of the transfer film, which portion is being pressed onto a printed sheet on the cylinder.

5. The surface treatment apparatus according to claim 2, wherein the UV radiation part is made up of an even number of UV lamps that are evenly divided into two parts that are respectively disposed on the opposite lateral sides of the printed sheet conveying path with respect to a vertical line passing through the rotational center of the cylinder, so as to be substantially symmetrically arranged about the vertical line.

6. The surface treatment apparatus according to claim 1, wherein the UV radiation part includes a UV radiation control means for enabling the UV radiation part to radiate UV rays both at a position close to the cylinder and at a position away from the cylinder.

7. The surface treatment apparatus according to claim 1, further comprising an emergency stop control means that starts moving the film pressing part and the UV radiation part respectively to the positions away from the cylinder when the surface treatment apparatus has been emergency stopped, and allows the UV radiation part to continue radiating UV rays for a predetermined time.

* * * * *